United States Patent
Bhattacharya et al.

(10) Patent No.: US 11,900,061 B2
(45) Date of Patent: Feb. 13, 2024

(54) INTELLIGENT INTERPRETATION OF TEMPORAL EXPRESSIONS

(71) Applicant: MICROSOFT TECHNOLOGY LICENSING, LLC, Redmond, WA (US)

(72) Inventors: Pamela Bhattacharya, Redmond, WA (US); Christopher Alan Meek, Kirkland, WA (US); Oleksandr Polozov, Seattle, WA (US); Alex James Boyd, Longview, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 318 days.

(21) Appl. No.: 17/230,300

(22) Filed: Apr. 14, 2021

(65) Prior Publication Data
US 2022/0343079 A1    Oct. 27, 2022

(51) Int. Cl.
*G06F 40/30* (2020.01)
*G06N 20/00* (2019.01)
*G06F 40/284* (2020.01)

(52) U.S. Cl.
CPC ............ *G06F 40/30* (2020.01); *G06F 40/284* (2020.01); *G06N 20/00* (2019.01)

(58) Field of Classification Search
CPC ........ G06F 40/30; G06F 40/284; G06N 20/00
See application file for complete search history.

(56) References Cited

U.S. PATENT DOCUMENTS

| 9,535,904 | B2 | 1/2017 | Prokofyev et al. | |
|---|---|---|---|---|
| 2015/0149203 | A1* | 5/2015 | Csurka | G16H 10/60 705/3 |
| 2018/0157958 | A1* | 6/2018 | Fourney | G06F 3/0237 |
| 2019/0103107 | A1* | 4/2019 | Cohen | G06F 40/279 |
| 2020/0104350 | A1* | 4/2020 | Allen | G06F 16/3334 |
| 2021/0365630 | A1* | 11/2021 | Itani | G06F 3/0482 |
| 2022/0122628 | A1* | 4/2022 | McCloskey | H04M 3/5183 |

(Continued)

FOREIGN PATENT DOCUMENTS

WO    2018102236 A1    6/2018

OTHER PUBLICATIONS

"International Search Report and Written Opinion Issued in PCT Application No. PCT/US22/021833", dated Jun. 27, 2022, 9 Pages.

(Continued)

*Primary Examiner* — Bhavesh M Mehta
*Assistant Examiner* — Darioush Agahi
(74) *Attorney, Agent, or Firm* — NovoTechIP International PLLC

(57) ABSTRACT

A method and system for predicting an intended time interval for a content segment may include receiving a request for natural language processing (NLP) of the content segment, the content segment including one or more temporal expressions, accessing contextual data associated with each of the one or more temporal expressions, decoding the content segment into a program that describes a temporal logic of the content segment based on the one or more temporal expressions, evaluating the program using the contextual data to predict an intended time interval for the content segment, and providing the intended time interval as an output.

15 Claims, 8 Drawing Sheets

(56) References Cited

U.S. PATENT DOCUMENTS

2022/0237368 A1* 7/2022 Tran ..................... G06N 3/045

OTHER PUBLICATIONS

"Prose", Retrieved from: https://web.archive.org/web/20210227151536/https://www.microsoft.com/en-us/research/group/prose/, Feb. 27, 2021, 1 Page.

Angeli, et al., "Parsing Time: Learning to Interpret Time Expressions", In Proceedings of the Conference of the North American Chapter of the Association for Computational Linguistics: Human Language Technologies, Jun. 3, 2012, pp. 446-455.

Campos, et al., "Survey of Temporal Information Retrieval and Related Applications", In ACM Computing Surveys, vol. 47, Issue 2, Article 15, Jul. 2014, 41 pages.

Chang, et al., "SUTime: A library for recognizing and normalizing time expressions", In Proceedings of the Eighth International Conference on Language Resources and Evaluation, May 23, 2012, 6 Pages.

Kanhabua, et al., "Temporal Information Retrieval", In Foundations and Trends in Information Retrieval, vol. 9, No. 2, Jul. 9, 2015, pp. 91-208.

Lee, et al., "Context-dependent semantic parsing for time expressions", In Proceedings of the 52nd Annual Meeting of the Association for Computational Linguistics, vol. 1, Jun. 23, 2014, pp. 1437-1447.

Polozov, et al., "FlashMeta: a Framework for Inductive Program Synthesis", In Proceedings of the ACM SIGPLAN International Conference on Object-Oriented Programming, Systems, Languages, and Applications, Oct. 25, 2015, pp. 107-126.

Rong, et al., "Managing Uncertainty in Time Expressions for Virtual Assistants", In Proceedings of the CHI Conference on Human Factors in Computing Systems, May 6, 2017, pp. 568-579.

Strotgen, et al., "HeidelTime: High quality rule-based extraction and normalization of temporal expressions", In Proceedings of the 5th International Workshop on Semantic Evaluation, Jul. 15, 2010, pp. 321-324.

Sun, et al., "Evaluating temporal relations in clinical text: 2012 i2b2 Challenge", In Journal of the American Medical Informatics Association, vol. 20, Issue 5, Apr. 5, 2013, pp. 806-813.

* cited by examiner

INTELLIGENT INTERPRETATION OF TEMPORAL EXPRESSIONS

TECHNICAL FIELD

This disclosure relates generally to intelligent interpretation of temporal expressions, and, more particularly, to a method of and system for intelligently predicting one or more intended time intervals for a content segment which includes one or more temporal expressions.

BACKGROUND

Many current applications and computer systems utilize natural language processing (NLP) to analyze contents. For example, NLP may be used to process and analyze contents of email messages, user commands directed to digital assistants, text messages, search queries and/or any other type of document containing natural language content. Sometimes the content being processed includes one or more temporal expressions that require interpretation. Understanding temporal expressions, however, is often challenging and complex. Frequently, temporal expressions are made with references to other events (e.g., explicit or implicit references), some of which may not be clear from the content segment. For example, a user request to a digital assistant of "tell me about the weather this weekend" may require an understanding of what the current date is, what dates are considered weekend days and the like. Furthermore, there are many diverse and complicated manners of articulating a temporal expression and some may be ambiguous. As a result, understanding and correctly interpreting temporal expressions is a complex undertaking.

A few techniques have been developed in recent years for interpreting temporal expressions. However, most of these techniques can only identify and interpret simple temporal expressions such as "tomorrow" or "next week." These techniques are not able to accurately interpret complex expressions of time. As a result, content segments including temporal expressions are often interpreted inaccurately. Given that many natural language content segments include temporal expressions, this is a significant shortcoming of current NLP systems.

Hence, there is a need for improved systems and methods of intelligently interpreting a content segment which includes one or more temporal expressions.

SUMMARY

In one general aspect, the instant disclosure describes a data processing system having a processor and a memory in communication with the processor wherein the memory stores executable instructions that, when executed by the processor, cause the data processing system to perform multiple functions. The functions may include receiving a request for natural language processing (NLP) of a content segment, the content segment including one or more temporal expressions, accessing contextual data associated with each of the one or more temporal expressions, decoding the content segment into a program that describes a temporal logic of the content segment based on the one or more temporal expressions, evaluating the program using the contextual data to predict an intended time interval for the content segment, and providing the intended time interval as an output.

In yet another general aspect, the instant application describes a method for predicting an intended time interval for a content segment, where the method includes the steps of receiving a request for natural language processing (NLP) of the content segment, the content segment including one or more temporal expressions, accessing contextual data associated with each of the one or more temporal expressions, decoding the content segment into a program that describes a temporal logic of the content segment based on the one or more temporal expressions, evaluating the program using the contextual data to predict an intended time interval for the content segment, and providing the intended time interval as an output.

In a further general aspect, the instant application describes a non-transitory computer readable medium on which are stored instructions that when executed cause a programmable device to receive a request for natural language processing (NLP) of a content segment, the content segment including one or more temporal expressions, access contextual data associated with each of the one or more temporal expressions, decode the content segment into a program that describes a temporal logic of the content segment based on the one or more temporal expressions, evaluate the program using the contextual data to predict an intended time interval for the content segment, and provide the intended time interval as an output.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
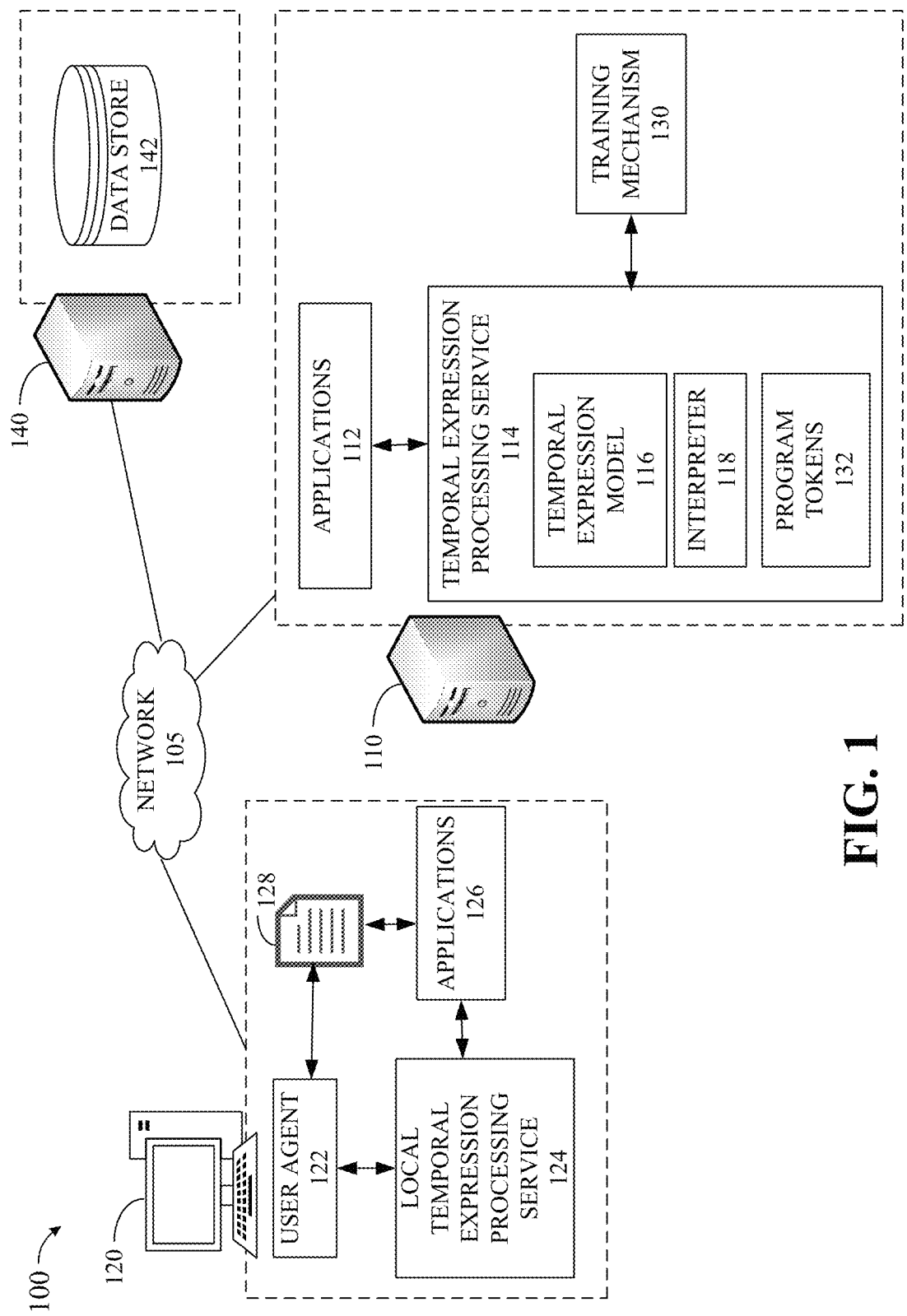
FIG. 1 depicts an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Many currently used applications and services utilize artificial intelligence (AI) to process, summarize and/or interpret content segments (e.g., a text segment). For example, AI assistance systems often aim to summarize natural language contents in a contextual manner to provide customized assistance to a user. To do so, these systems often need to understand and interpret the user's intent accurately. In an example, an application that summarizes email messages received when the user is out of office, or assists users to prioritize their task lists, needs to understand the user's intent as a natural language query. Temporal expressions are commonly involved in expressing and/or understanding the user's intent. For example, to summarize emails received while the user is out of office, the system needs to understand that being out of office represents a date/time interval. Similarly, to rank the items on the user's task list to help them prioritize efficiently, the assistance needs to understand contextual information about deadlines. Processing such information and/or simple queries such as "what is the weather tomorrow," may require identifying temporal expressions from natural language information and content and representing the temporal expressions in time interval objects that other systems can interpret or use in their search queries.

Understanding and interpreting temporal expressions, however, requires more than merely understanding a phrase. Many temporal expressions include ambiguity and explicit or implicit references to other time references. Some current NLP systems include mechanisms for interpreting simple temporal expressions such as "next week" or "tomorrow." However, none of the existing mechanism can handle complex temporal expressions that are often encountered in content segments. For example, a digital assistant request to "book a meeting next week. Monday or Tuesday works best" often fails to correctly identify the preferred time interval. In this example, most existing models fail to associate Monday and Tuesday to next week. Thus, there exists a technical problem of correctly processing and interpreting a user's intent involving temporal expressions.

Additionally, humans can express a temporal intent in many different diverse and complex manners. For example, the time period for today after 3 in the afternoon can be expressed as "today after 3," "any time after 3 pm," "not before 3," "after 15," or "after 1500 today," among others. This makes the process of correctly interpreting temporal expressions using traditional NLP systems even more challenging, as the same temporal intent can be expressed in many different and sometimes unpredictable ways. Thus, there also exists a technical problem of accurately interpreting many different manners of expressing a temporal intent. Furthermore, currently used NLP models that interpret temporal expressions require a significantly large amount of labeled data to be properly trained. Thus, there exists another technical problem of reducing the time and computing resources required for training an NLP model that can interpret temporal expressions accurately.

To address these technical problems and more, in an example, this description provides a technical solution for intelligently interpreting a content segment which contains one or more temporal expressions. To do so, techniques may be used to provide a temporal expression service that utilizes an NLP model which receives a content segment as an input and provides an instance of a program in an appropriate domain-specific language that describes the temporal logic of the content segment. The instance of the program may then be used by an interpreter to predict intended time intervals for the content segment. Thus, the temporal expression service makes use of program synthesis to efficiently train a lightweight NLP that provides accurate interpretation of temporal expressions. The resulting temporal expression service can predict the user's intended time references accurately and efficiently. Various steps of these mechanisms may be performed by utilizing one or more machine-learning (ML) models. As a result, the technical solution provides an improved method of intelligently interpreting content segments which contain one or more temporal expressions.

As will be understood by persons of skill in the art upon reading this disclosure, benefits and advantages provided by such implementations can include, but are not limited to, a technical solution to the technical problems of inefficient and inaccurate interpretation of temporal expressions in NLP systems. Solutions and implementations provided herein optimize the process of understanding and processing interpretation of temporal expressions by utilizing an instance of program in an appropriate domain-specific language. The benefits provided by these technology-based solutions yield more user-friendly applications that provide more accurate processing of temporal expressions, as well as improved processing and system efficiency.

As used herein, the term "temporal expression" may refer to any phrase, utterance or text segment that includes a time reference. Furthermore, as used herein, the term "content segment" may refer to a portion of any digital content and may include a text segment and a spoken utterance. The user's "desired intent" may refer to a desired outcome or a desire to achieve a certain result. Additionally, "intent" may refer to a goal the user desires to accomplish.

FIG. 1 illustrates an example system 100, upon which aspects of this disclosure may be implemented. The system 100 may include a server 110 which may include and/or execute a temporal expression processing service 114. The server 110 may operate as a shared resource server located at an enterprise accessible by various computer client devices such as client device 120. The server may also operate as a cloud-based server for offering global temporal expression processing service. Although shown as one server, the server 110 may represent multiple servers for performing various different operations. For example, the server 110 may include one or more processing servers for performing the operations of the temporal expression processing service 114 and the applications 112.

The temporal expression processing service 114 may provide intelligent processing and interpretation of temporal expressions. The temporal expression processing service 114 may operate to examine a received or inferred content segment (e.g., text segment, spoken utterance, search query and the like), parse the content segment to identify one or more tokens in the content segment, generate predicted program tokens 132 for an instance of a program in an appropriate domain-specific language, and execute the program using an interpreter 118 to predict the intended date/time intervals for the content segment. In some implementations, the interpreter 118 is a domain-specific language (DSL) interpreter that directly executes instructions written in the program even if they are written in a DSL. In executing the program instance, the interpreter 118 may examine at least one or more of document context information, user context information (e.g., user-specific information), organization-specific information, global user information, and/or other data to convert the temporal expression to an intended date/time interval. At least some of the operations of the temporal expression processing service 114 may be provided by one or more ML models such as the temporal expression model 116.

The program tokens 132 may specify the syntax for a DSL in which the program is written. As such, the program tokens 132 may include phrases that are used by the programming language. For example, they may include "except", "and", "before", "after", and the like. In some implementations, the program tokens 132 includes base objects (e.g., Time, Date, Duration, TimeInterval, etc.), operations (e.g., And/or/Except, Before, This/Next, Every Other, StartOf/EndOf, TimeSpans, DaySpans, etc.), and/or Constants (Day/Week/Month, Mon/Tue/ . . . , Jan/Feb/ . . . , Morning/Afternoon, Anytime, Now, EarlyInTheWeek, etc.).

The server 110 may be connected to or include a storage server 140 containing a data store 142. The data store 142 may function as a repository in which documents, contextual information and/or data sets (e.g., training data sets) may be stored. One or more ML models used by the temporal expression processing service 114 may be trained by a training mechanism 130. The training mechanism 130 may use training data sets stored in the data store 142 to provide initial and ongoing training for each of the models. Alternatively, and/or additionally, the training mechanism 130 may use training data sets unrelated to the data store. This may include training data such as knowledge from public repositories, knowledge from other enterprise sources, and/or knowledge from other pretrained mechanisms (e.g., pretrained models). In one implementation, the training mechanism 130 may use labeled training data from the data store 142 to train one or more of the ML models via deep neural network(s) or other types of ML algorithms. Alternatively, and/or additionally, the training mechanism 130 may use unlabeled training data. The initial training may be performed in an offline stage or may be performed online. Additionally, and/or alternatively, the one or more ML models may be trained using batch learning.

As a general matter, the methods and systems described herein may include, or otherwise make use of, a machine-trained model to interpret a temporal expression. Machine learning (ML) generally involves various algorithms that a computer can automatically learn over time. The foundation of these algorithms is often built on mathematics and statistics that can be employed to predict events, classify entities, diagnose problems, and model function approximations. As an example, a system can be trained using data generated by a ML model in order to identify patterns in user activity and/or determine associations between various actions and commands. Such determination may be made following the accumulation, review, and/or analysis of data from a large number of users over time, that may be configured to provide the ML algorithm (MLA) with an initial or ongoing training set. In addition, in some implementations, a user device can be configured to transmit data captured locally during use of relevant application(s) to the cloud or the local ML program and provide supplemental training data that can serve to fine-tune or increase the effectiveness of the MLA. The supplemental data can also be used to facilitate identification of relevant commands and/or to increase the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of these ML models may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, size or complexity of a model may be varied between different ML models, such as a maximum depth for decision trees, or a number and/or size of hidden layers in a convolutional neural network. As another example, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be continually updated, and one or more of the models used by the system can be revised or regenerated to reflect the updates to the training data. Over time, the training system (whether stored remotely, locally, or both) can be configured to receive and accumulate more and more training data items, thereby increasing the amount and variety of training data available for ML model training, resulting in increased accuracy, effectiveness, and robustness of trained ML models.

It should be noted that the ML model(s) discussed herein may be hosted locally on the client device 120 or remotely, e.g., in the cloud. In one implementation, some ML models are hosted locally, while others are stored remotely. This may enable the client device 120 to provide some temporal expression processing service even when the client device 120 is not connected to a network.

The server 110 may also include or be connected to one or more online applications 112 that allow a user to interactively view, generate and/or edit digital content. Examples of suitable applications include, but are not limited to, an email application, a calendar or scheduler application, a word processing application, a presentation application, a note taking application, a spreadsheet application, an instant messaging application, a communications application, and a collaboration application.

The client device 120 may be connected to the server 110 via a network 105. The network 105 may be a wired or wireless network(s) or a combination of wired and wireless networks that connect one or more elements of the system 100. The client device 120 may be a personal or handheld computing device having or being connected to input/output elements that enable a user to interact with digital content such as content of an electronic document 128 on the client device 120. Examples of suitable client devices 120 include, but are not limited to, personal computers, desktop computers, laptop computers, mobile telephones; smart phones; tablets; phablets; smart watches; wearable computers; gaming devices/computers; televisions; head-mounted display devices and the like. The internal hardware structure of a client device is discussed in greater detail in regard to FIGS. 7 and 8.

The client device 120 may include one or more applications 126. Each application 126 may be a computer program executed on the client device that configures the device to be responsive to user input to allow a user to interactively view, generate and/or edit digital content such as content within the electronic document 128. The electronic document 128 can include any type of data, such as text (e.g., alphabets, numbers, symbols), emoticons, still images, video and audio. The electronic document 128 and the term "document" used herein can be representative of any file that can be created via an application executing on a computer device. Examples of documents include, but are not limited to, email messages, word-processing documents, presentations, spreadsheets, notebooks, and the like. The electronic document 128 may be stored locally on the client device 120, stored in the data store 142 or stored in a different data store and/or server.

The applications 126 may receive a content segment via user input through an input device (e.g., keyboard, microphone, and the like). Examples of suitable applications include, but are not limited to, an email application, a calendar or scheduler application, a word processing application, a presentation application, a note taking application, a spreadsheet application, an instant messaging application, a communications application, and a collaboration application.

The client device 120 may also access applications 112 that are run on the server 110 and provided via an online service as described above. In one implementation, applications 112 may communicate via the network 105 with a user agent 122, such as a browser, executing on the client device 120. The user agent 122 may provide a UI that allows the user to interact with application content and provide one or more content segments. The UI may be displayed on a display device of the client device 120 by utilizing, for example, the user agent 122. In some examples, the user agent 122 may be a dedicated client application that provides a UI and receives content segments for processing (e.g., for a search engine).

In one implementation, the client device 120 may also include a local temporal expression processing service 124 for providing some temporal expression processing. In an example, the temporal expression processing service 124 may operate with the applications 126 to provide local temporal expression processing and interpretation services. For example, when the client device 120 is offline, the local temporal expression processing service 124 may make use of one or more local models to interpret a temporal expression and convert it to a time interval. It should be noted that each of the temporal expression processing service 114 and local task temporal expression processing service 124 may be implemented as software, hardware, or combinations thereof.

Figure 2:
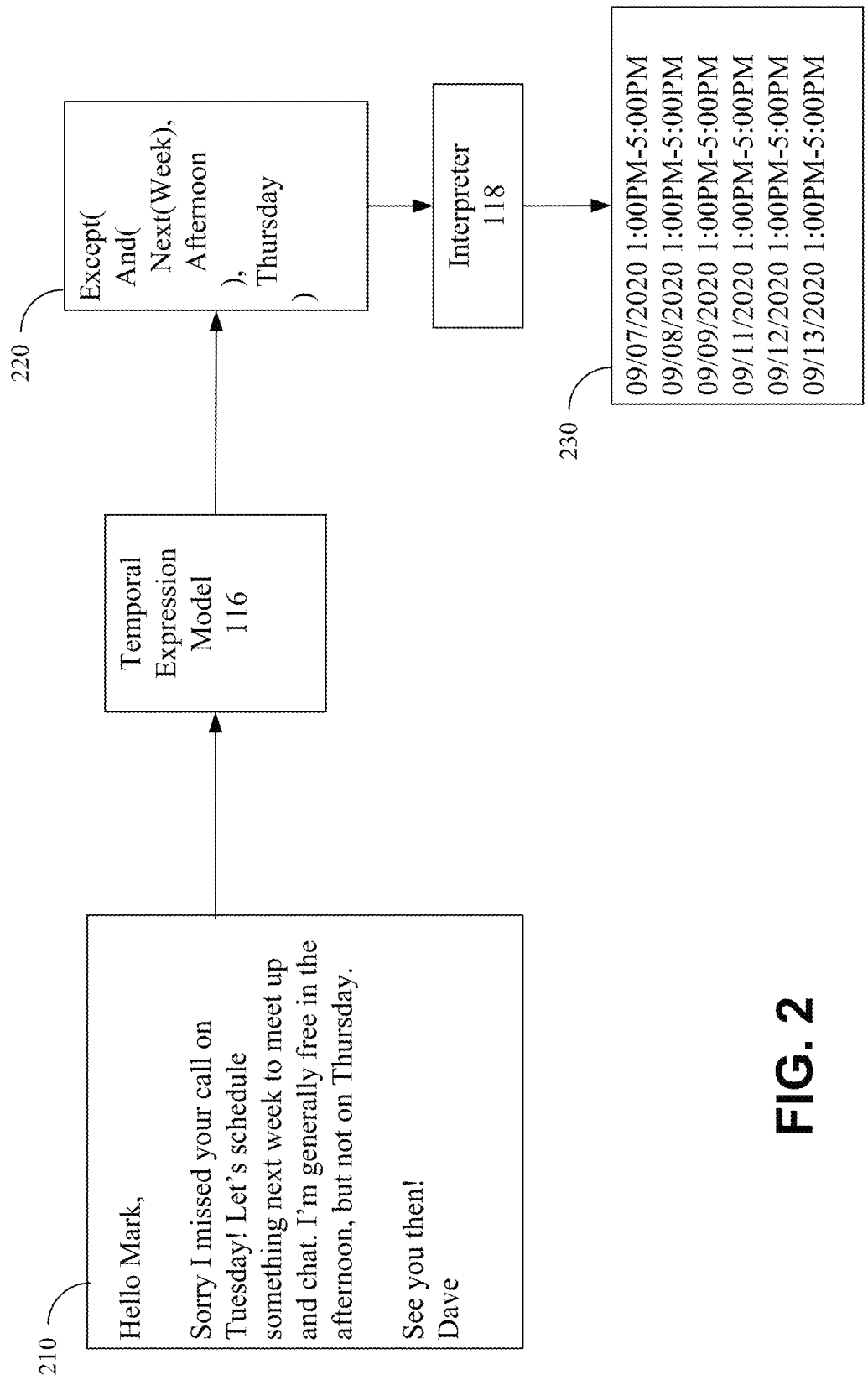
FIG. 2 depicts an example system level data flow between a content segment having one or more temporal expressions and predicted time intervals generated by a system upon which aspects of this disclosure may be implemented.

FIG. 2 depicts an example system level data flow between a content segment having one or more temporal expressions and predicted time intervals. In some implementations, the content segment is an email message such as the message 210. The message 210 may be associated with contextual information such as metadata about the message. In some examples, the metadata may include the date and/or time the message was transmitted, the person from which it was sent, the person to whom it was directed, and/or user information about the sender and/or the receiver (e.g., their normal work schedule hours, and the like). In some implementations, the contextual information may be transmitted directly to the interpreter 118, as further discussed below.

Once the message 210 is received (e.g., the receiver transmits a request to a scheduler to schedule a meeting based on the message), it may be transferred to the temporal expression model 116 for processing. The model may parse the message content, extract one or more tokens from the message 210 and process the tokens to generate a program 220 based on the tokens via program synthesis. Program synthesis involves generating a program in some underlying domain-specific programming language (e.g., SQL) given a specification of the program's intent from the user. Program synthesis may be used to cast interpretation of temporal expressions as an instance of a program in an appropriate DSL. In this manner, the phrase "let's schedule something next week to meet up and chat. I'm generally free in the afternoon, but not Thursday" may be decoded to a hypothetical date/time interval program 220 which states "Except (And(Next(Week), Afternoon), Thursday). In another example, a content segment containing the phrase "next week is ok but I'm off on Wed after lunch" may be mapped to a hypothetical date/time interval program "Except(Union (Mon . . . Fri), Range(Wed 12:00 pm . . . Wed 11:59 pm))".

This type of temporal expression interpretation provides multiple technical advantages. First, program synthesis systems leverage inherent compositionality in training data. As such, when the system can parse intervals such as "Wed after lunch" and can also recognize exceptions such as "but I'm off on Thursday," it can parse the entire complex content segment automatically. Second, presenting interpretations of date/time intervals as programs provides the advantage of enabling a developer or human worker to easily inspect the predicted program for a given input, correct it, correct a whole class of mistakes when needed, or automatically translate the program into natural language as an explanation for the user. Thus, by interpreting a content segment which includes temporal expressions into a program, the system can provide a mechanism for processing complex temporal expressions which is simple and efficient to train and operate.

Once the program 220 is generated, it may be transmitted to the interpreter 118 for execution. The interpreter 118 may be a DSL interpreter designed for the specific DSL in which the program 220 is generated. The interpreter 118 may receive contextual information such as the date and time of the message 210 and use this information to execute the program 220. By determining when the original message 210 was received, the interpreter 118 can use logic to determine the time interval for next week. From that determination, the interpreter 118 may proceed to execute program 220 to produce the output date/time intervals 230. Thus, when the message 210 is received on Aug. 31, 2020, the interpreter can correctly predict availability on Sep. 7, 2020, Sep. 8, 2020, Sep. 9, 2020, Sep. 11, 2020, Sep. 12, 2020, Sep. 13, 2020, from 1:00 to 5:00 PM. In some implementations, additional contextual information is taken into account to determine that the user's intended availability is for workdays. This type of contextual information may be provided as an input to the temporal expression model 116 which may then generate the program 220 such that it excludes weekend dates. Alternatively or additionally, the contextual information may be provided to the interpreter 118 and used as logic to exclude those dates.

Figure 3:
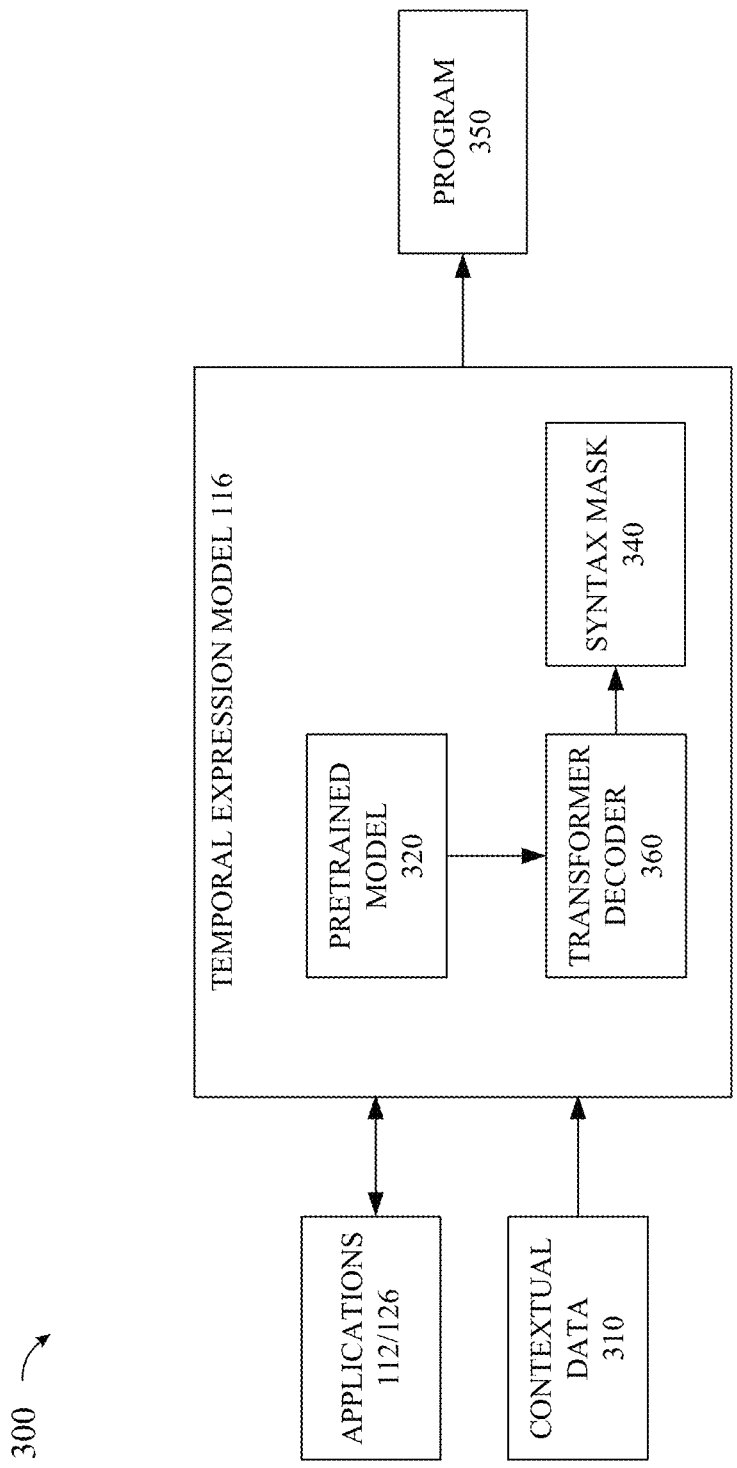
FIG. 3 depicts an example systems level data flow between some elements of the system and a temporal expression model.

FIG. 3 depicts a systems level data flow 300 between some of the elements of the system and a temporal expression model. Upon receiving a query or an indication that temporal expression processing is required, a content segment containing one or more temporal expressions may be transmitted from the applications 112/126 to the temporal expression model 116. As discussed above, this may involve first transmitting the content segment to a temporal expression processing service (e.g., temporal expression processing service 114 of FIG. 1).

In addition to receiving the content segment, the temporal expression model 116 may also receive contextual data 310. The contextual data 310 may include information about the user (e.g., person who created the content segment and/or person to whom it is directed), information about the document in which the content segment is created (e.g., type of document, type of application used), and/or additional information about the content segment (e.g., date/time it was created or transmitted). In an example, contextual data 310 may also include the subject matter of the document (which may be or may have been inferred separately and/or in the past by one or more ML models), the type of document (e.g., scientific article, poetry, patent application, etc.), and the person(s) to whom it is directed (e.g., the to line of an email message), as well as user specific data such as the position of the user within an organization (e.g., the user's job title or department to which the user belongs, if known), the user's preferred schedule (e.g., user usually works on weekdays from 9 am to 6 pm and on Saturdays from 10 am to 12 pm), the user's history (e.g., the user's writing style in using temporal expressions), user profile data (e.g., various profiles within which the user creates content such as work profile, blogger profile, social media profile and the like) and the like. The contextual data 310 may be transmitted directly from the document and/or application or may be transmitted from other services that provide the specific type of information. In some implementations, some of the information is transmitted from a data repository such as the data store 142 of FIG. 1. The data repository may contain user-specific data about the user. For example, it may contain user profile and/or use history data. The data contained in the data store 142 may be provided as an input directly from the data store 142 or it may be retrieved by applications 126/applications 112 and transmitted from them.

The temporal expression model 116 may be an NLP model and may include one or more pretrained models 320 and a transformer decoder 360. The pretrained model 320 may be a Bidirectional Encoder Representations from Transformers (BERT) model. As is known in the art, BERT models are pretrained NLP models for performing natural language understanding (NLU) tasks. By using a pretrained BERT model, the temporal expression model 116 may provide high performance NLP and NLU without a need for extensive training.

In some implementations, the temporal expression model 116 receives the content segment from applications 112/126, parses the content segment and provides tokens from the content segment to the pretrained model 320. The pretrained model 320 may function as a transformer encoder to encode the tokens into inter-representations that are transmitted to the transformer decoder 360. Upon receiving the encoded inter-representations, the transformer decoder 360 may generate a first version of the program 350 one token at a time. This may involve examining the inter-representations generated by the pretrained model (e.g., encoder) and computing which possible tokens would be appropriate after the current token in the DSL. For example, if the current examined inter-representation is "next," in the selected DSL, the next appropriate token may be an open parenthesis, followed by a period of time. Thus, once a token for the phrase "next" is encountered, an open parenthesis is computed as the next token in the program 350.

As part of the process of generating the program 350, the temporal expression model 116 may utilize a syntax mask 340 to mask out tokens that are inappropriate/illegal in the DSL at specific points in the program. For example, it may be known in the DSL, that the token "except" cannot appear after the token "next." Thus, if the currently encountered token is the phrase "next," the syntax mask 340 may mask out the phrase "except" from the list of possible tokens that can appear after the current token. As such, by utilizing the syntax mask 340, the temporal expression model 116 may exclude one or more tokens that are inappropriate for the program given previously decoded program tokens. This enables the temporal expression model 116 to ensure that the program 350 is syntactically correct. In this manner, the temporal expression model 116 may receive a content segment and provide a program 350 as an output. The program 350 may represent the intent of the content segment and when executed, in light of the contextual data 310, may provide one or more intended time intervals as the output.

Figure 4:
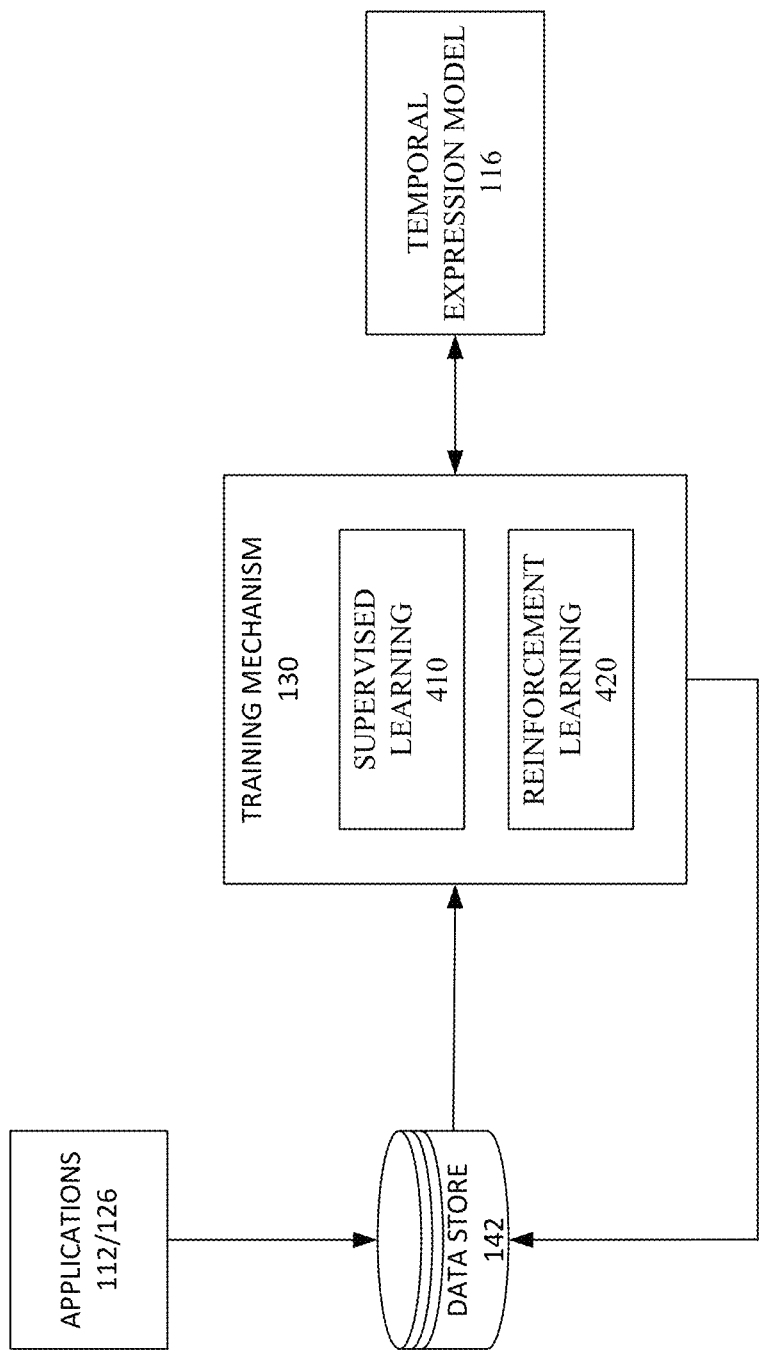
FIG. 4 depicts an example process for training one or more NLP models used by a temporal expression service.

FIG. 4 depicts example elements involved in the process of training the NLP models used by the temporal expression service. The temporal expression model 116 may be trained by utilizing the training mechanism 130. The training mechanism 130 may make use of both supervised learning 410 and reinforcement learning 420. Supervised learning 410 may involve using a labeled training data set containing a set of labeled programs. The labeled data set may be generated manually and may include a set of programs generated for given content segments that contain one or more temporal expressions. The labeled data set may also include date/time intervals that correspond to the given content segments' intent. The labeled data set may be a small sized data set (e.g., a few hundred programs) and may be stored in the data store 142 or in any other storage server.

In addition to the supervised learning 410, the training mechanism 130 may make use of reinforcement learning 420 to train the temporal expression model 116. The reinforcement learning process may be achieved by using a labeled data set which only includes content segments and date/time intervals that correspond with each content segments. In some implementations, this labeled data set is generated by making use of application data. For example, data from user's usage of applications 112/126 may be collected over a period of time. This data may include content segments retrieved from messages, emails, search queries and the like and date/time intervals that correspond to those content segments. However, the data may not include the programs used to generate the date/time intervals. For example, content of email messages relating to scheduling of meetings and the intended date/time intervals that correspond to the content may be collected over a time period to generate the labeled data set for reinforcement learning 420. The date/time intervals that correspond to the content may be referred as true times. In some implementations, the data set used for reinforcement learning 420 may include more data than the data set used for the supervised learning 410. However, since this data is collected over time from usage, it is less costly to generate, and as such more efficient for training. It should be noted that in collecting and storing this information, care must be taken to ensure privacy is persevered.

To ensure compliance with ethical and privacy guidelines and regulations, in one implementation, an optional user interface (UI) element may be provided to inform the user of the types of data collected, the purposes for which the data may be used and/or to allow the user to prevent the collection and storage of user related data. The UI may be accessible as part of features provided for an application via a UI displayed by the application. Alternatively, the information may be presented in a user agreement presented to the user when they first install the application. Furthermore, care may be taken to remove all confidential, private and/or identifying information from the data collected.

Reinforcement learning 420 may involve using the labeled data to back propagate the transformer decoder and pretrained model (e.g., transformer decoder 360 and pretrained model 320 of FIG. 3) of the temporal expression model 116. This may result in generating sampled decoded programs. The sampled decoded programs may then be used to predict sampled date/time intervals. The sampled date/time intervals may then be compared to the true times to determine the accuracy of the process and the reinforcement learning may be repeated until the sampled date/time intervals are within an acceptable threshold from the true times.

Figure 5:
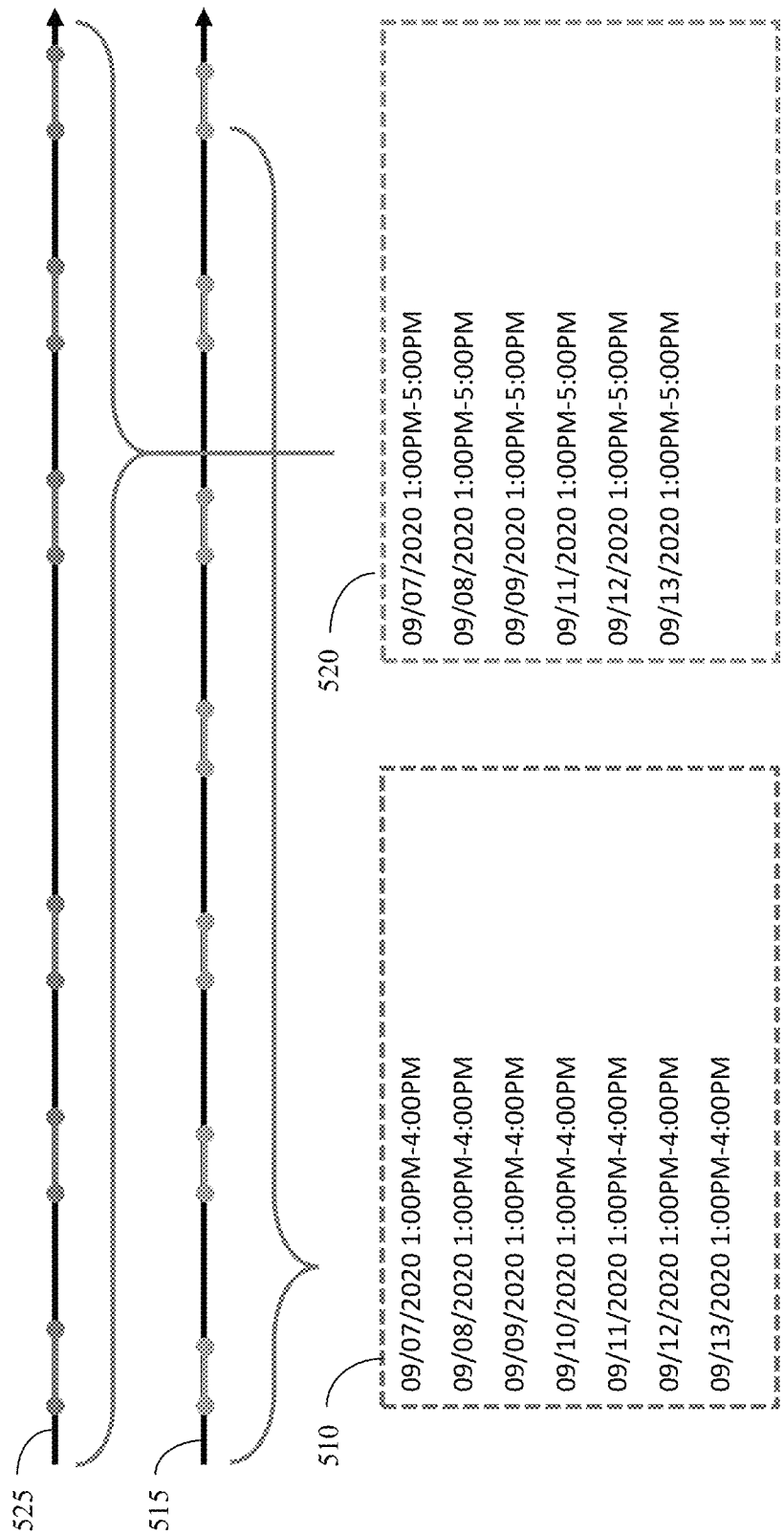
FIG. 5 depicts a comparison between example sampled date/time intervals and true times for a given content segment.

FIG. 5 depicts a comparison between example sampled date/time intervals and true times for a given content segment. The date/time intervals 510 may represent true times, while the date/time intervals 420 represents sampled date/time intervals generated during reinforcement learning. The axis 515 depicts the true times 510 on a time axis, while the axis 525 depicts the sampled date/time intervals 520 on a time axis. As shown by the comparison, while the sampled date/time intervals 520 overlap with some of the true times 510, there are some differences between them. The process of reinforcement learning continues the learning process until the sampled date/time intervals are within a given threshold of the true times.

In some implementations, reinforcement learning is implemented by optimizing the following mathematical objectives using stochastic gradient descent.

$$\mathcal{L}_R = \mathbb{E}_{x,y \sim \mathcal{L}} \mathbb{E}_{\hat{y} \sim p_\Theta(\cdot|x)}[-r(\hat{y},y;x)] \quad (1)$$

$$r(\hat{y},y;)=\hat{r}(\hat{y},y)-r(\bar{y},y) \quad (2)$$

$$\hat{r}(\hat{y},y)=\log WD(\mu_{\hat{y}},\mu_y) \quad (3)$$

$$WD_1(\mu_1,\mu_2)= \int_{\mathbb{R}} |F_{\mu_1}(t)-F_{\mu_2}(t)|dt \quad (4)$$

In the above mathematical objectives, $\mathcal{L}_R$ may represent the loss function of training the parameters for the model, x may represent the content segment, and y may represent a set of true time intervals. Furthermore, $\hat{y}$ may be used to represent a set of sampled date/time intervals from a sampled program, while $\bar{y}$ may characterize a set of date/time intervals from a greedily decoded program. Moreover, μ may represent a measure of a distribution associated with y and WD may represent the Wasserstein distance.

The mathematical objective (1) to be minimized by reinforcement learning is the expected difference between the sampled date/time intervals $\hat{y}$ and the true date/time intervals y at a given step of the training process conditioned on a content segment x, averaged over all training samples (x,y) in the training dataset D. The difference between two date/time interval sets $\hat{r}(\hat{y}, y)$ is defined as the logarithm of the Wasserstein distance (3) between one-dimensional measures $\mu_{\hat{y}}$, $\mu_y$ representing the date/time intervals $\hat{y}$, y respectively. A measure $\mu_y$ for the distribution associated with a set of date/time intervals y is a scalar function defined as 1 on all the points on the timeline that belong to the date/time intervals y and 0 on all other points. The one-dimensional Wasserstein distance $WD_1$ between any two one-dimensional measures $\mu_1$, $\mu_2$ can be computed as the integral of the absolute difference between their cumulative functions $F_{\mu_1}$(t), $F_{\mu_2}$(t) respectively. When the measures represent distributions for a finite set of date/time intervals (as is the case for the date/time intervals produced by temporal logic programs with a fixed horizon), their Wasserstein distance can be computed by iterating over sorted starts or ends of the respective date/time intervals and accumulating the absolute difference between their cumulative lengths. Finally, to make reinforcement learning more stable, the optimization objective (2) may subtract the baseline difference r($\bar{y}$, y) between the greedily decoded date/time intervals and the true date/time interval.

Referring back to FIG. 4, to provide ongoing training, the training mechanism 130 may also use training data sets received from the trained temporal expression model 116. Furthermore, data may be provided from the training mechanism 130 to the data store 142 to update one or more of the training data sets in order to provide updated and ongoing training. Additionally, the training mechanism 130 may receive training data such as knowledge from public repositories (e.g., Internet), knowledge from other enterprise sources, or knowledge from other pretrained mechanisms.

Figure 6:
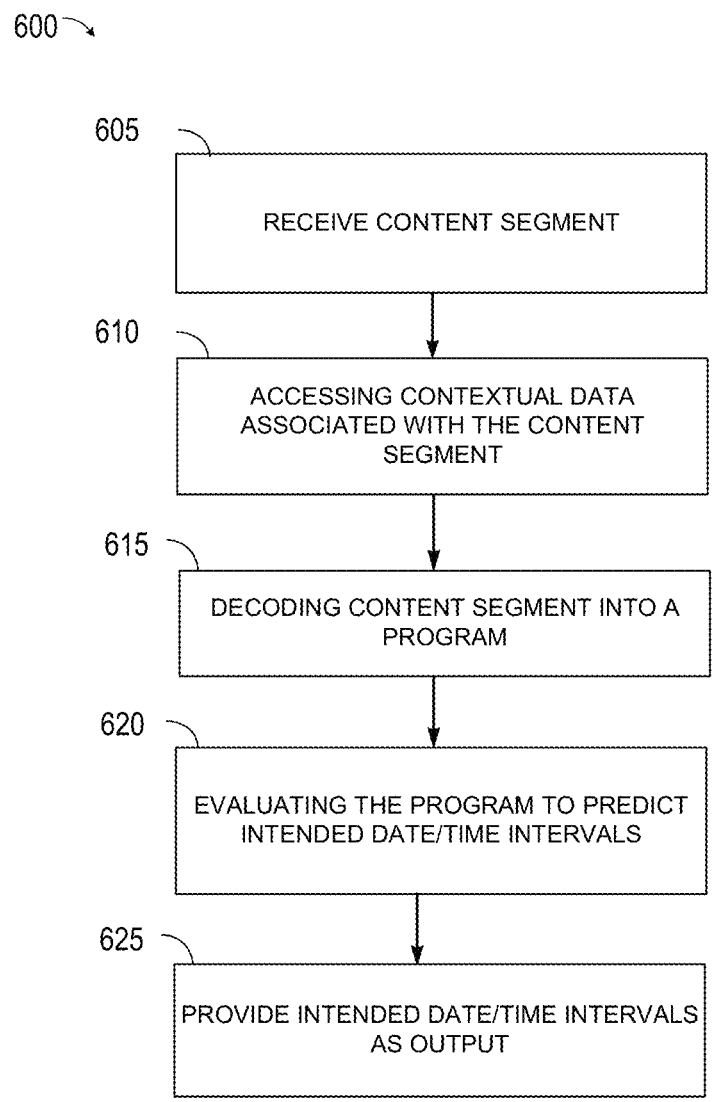
FIG. 6 is a flow diagram depicting an example method for providing intelligent prediction of intended time intervals for a content segment containing a temporal expression.

FIG. 6 is a flow diagram depicting an exemplary method 600 for providing intelligent prediction of intended time intervals for a content segment containing a temporal expression. In an example, one or more steps of method 600 may be performed by a temporal expression processing service (e.g., temporal expression processing service 114 of FIG. 1). Other steps of method 600 may be performed by an application (e.g., applications 112 or applications 126 of FIG. 1).

At 605, method 600 may begin by receiving a content segment. In some implementations, this occurs upon receiving an indication of user action that signals the user may have a desired intent to complete a task or achieve a purpose involving interpretation of a time interval. For example, the user may submit a request to schedule a meeting based on a received email message. In another example, the user may submit a search query that includes a temporal expression (e.g., news articles discussing wildfires dated from July 2020 to October 2020 excluding August 2020). In yet another example, a request may be received for performing a data analysis operation for a given time period (e.g., show me the Azure application insight logs over last 24 hours). Each of the above user requests includes a content segment that contains one or) more temporal expressions.

Upon receiving the content segment, method 600 may proceed to access contextual data associated with the content segment, at 610. The contextual data may include contextual document data, user-specific data, enterprise-specific data, and/or any other data that may provide helpful information in inferring the user's desired intent with respect to the content segment. In some implementations, at least some of the contextual data may be received along with the content segment (e.g., date and/or time of the content segment). The contextual data may be stored in a storage medium and provided to the temporal expression processing service, as requested and/or needed.

Once the contextual data has been accessed, method 600 may proceed to decode the content segment into a program that describes the temporal logic of the content segment, at 615. This may be achieved by using an NLP model (e.g., a temporal expression model) that makes use of program synthesis (e.g., Neuro-Symbolic Program Synthesis) to incrementally generate the program using transformer encoder and decoders. The program may be in a specific DSL and may help predict the user's desired intent with respect to the content segment.

Once the program is decoded, method 600 may proceed to evaluate the program in light of the contextual data to predict the intended date and/or time intervals for the content segment, at 620. This may involve using an interpreter such as a DSL interpreter corresponding to the DSL of the program that executes the program while taking into account any necessary contextual data. For example, the interpreter may identify the date and time the content segment was received and execute the program in light of the received date and time to determine the intended date and/or time interval for the content segment. Once the intended date and/or time intervals are predicted, method 600 may proceed to provide the predicted date and/or time intervals as an output, at 625. The output may be utilized, as needed, by the application transmitting the request to proceed in fulfilling the user's request (e.g., scheduling a meeting, providing search results for the predicted time interval, and the like).

Figure 7:
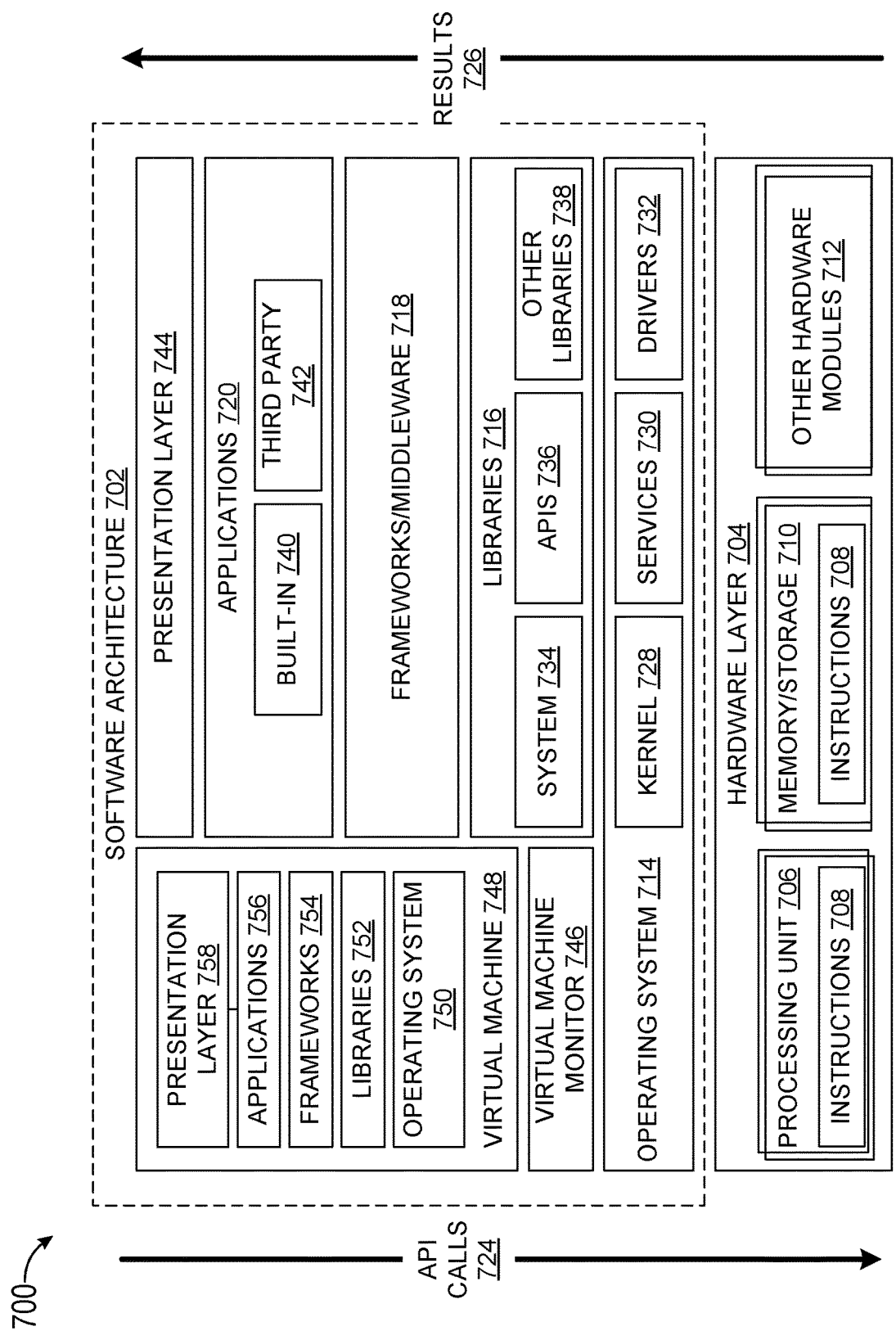
FIG. 7 is a block diagram illustrating an example software architecture, various portions of which may be used in conjunction with various hardware architectures herein described.

FIG. 7 is a block diagram 700 illustrating an example software architecture 702, various portions of which may be used in conjunction with various hardware architectures herein described, which may implement any of the above-described features. FIG. 7 is a non-limiting example of a software architecture and it will be appreciated that many other architectures may be implemented to facilitate the functionality described herein. The software architecture 702 may execute on hardware such as client devices, native application provider, web servers, server clusters, external services, and other servers. A representative hardware layer 704 includes a processing unit 706 and associated executable instructions 708. The executable instructions 708 represent executable instructions of the software architecture 702, including implementation of the methods, modules and so forth described herein.

The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular system. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine depicted in block diagram 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
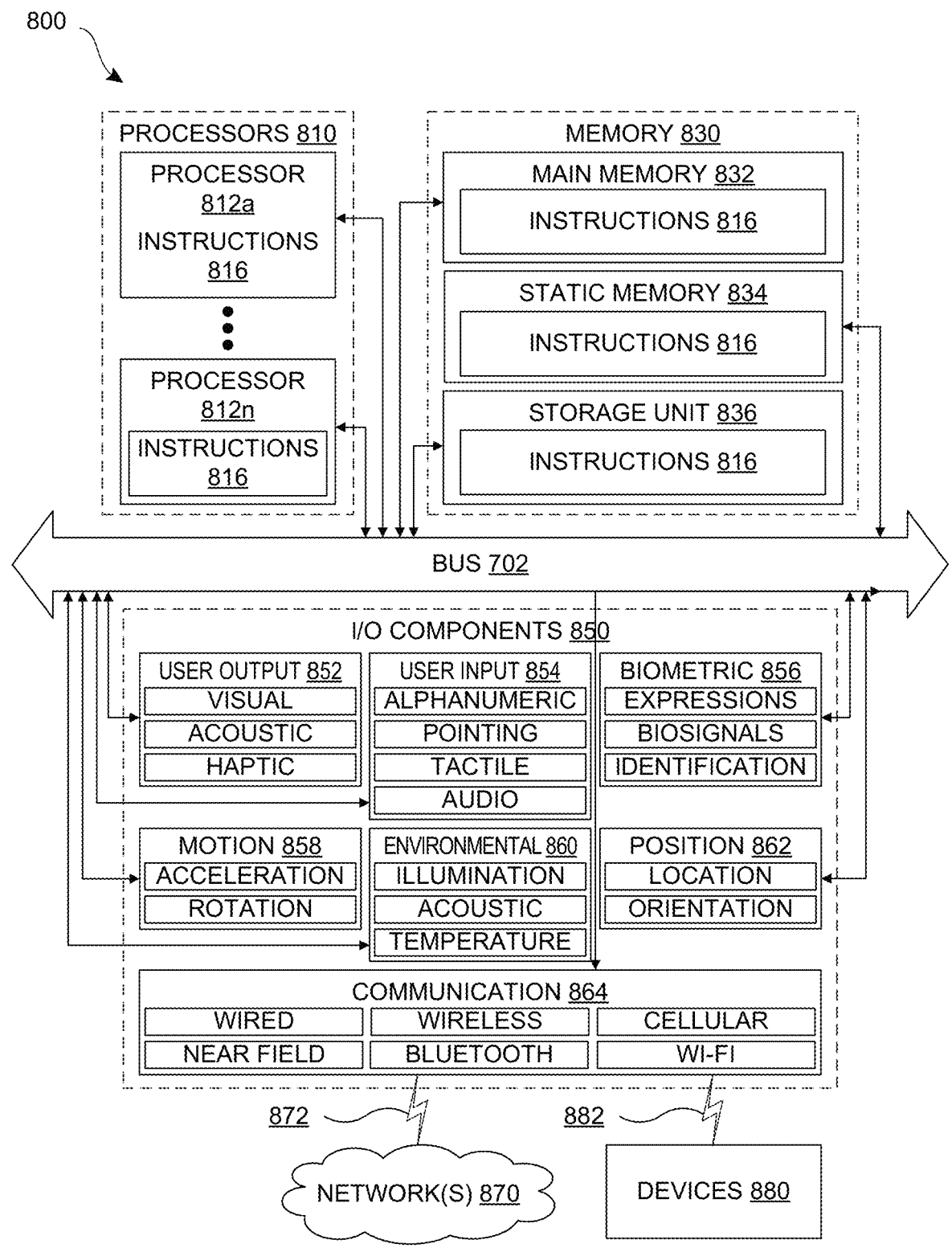
FIG. 8 is a block diagram illustrating components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement methods or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860 and/or position components 862, among a wide array of other environmental sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 862 may include, for example, location sensors (for example, a Global Position System (GPS) receiver), altitude sensors (for example, an air pressure sensor from which altitude may be derived), and/or orientation sensors (for example, magnetometers). The motion components 858 may include, for example, motion sensors such as acceleration and rotation sensors. The environmental components 860 may include, for example, illumination sensors, acoustic sensors and/or temperature sensors.

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
  a processor; and
  a memory in communication with the processor, the memory comprising executable instructions that, when executed by, the processor, cause the data processing system to perform functions of:
    receiving a request for natural language processing (NLP) of a content segment, the content segment including one or more temporal expressions;
    accessing contextual data associated with each of the one or more temporal expressions;
    decoding the content segment into a program that describes a temporal logic of the content segment based on the one or more temporal expressions;
    evaluating the program using the contextual data to predict an intended time interval for the content segment; and
    providing the intended time interval as an output.

Item 2. The data processing system of item 1, the memory further storing executable instructions that, when executed by, the processor, cause the data processing system to:
  provide the content segment to an NLP model as an input; and
  receive the program as an output from the NLP model.

Item 3. The data processing system of item 2, wherein the NLP model is trained by using at least one of supervised learning and reinforcement learning.

Item 4. The data processing system of item 2, wherein the NLP model includes a pretrained transformer for encoding the content segment and a transformer decoder for decoding the program.

Item 5. The data processing system of claim 2, wherein the NLP model utilizes syntax masking to exclude one or more tokens that are inappropriate for the program given one or more previously decoded program tokens.

Item 6. The data processing system of any preceding item, wherein the program is in a domain-specific language.

Item 7. The data processing system of any preceding item, wherein the executable instructions include a domain-specific interpreter and the memory further stores executable instructions that, when executed by, the processor, cause the data processing system to:
  provide the program and the contextual data to the domain-specific language interpreter for evaluating the program; and
receiving the intended time interval as an output from the domain-specific language interpreter.

Item 8. A method for predicting an intended time interval for a content segment, comprising:
  receiving a request for natural language processing (NLP) of the content segment, the content segment including one or more temporal expressions;
  accessing contextual data associated with each of the one or more temporal expressions;

decoding the content segment into a program that describes a temporal logic of the content segment based on the one or more temporal expressions;

evaluating the program using the contextual data to predict an intended time interval for the content segment; and providing the intended time interval as an output.

Item 9. The method of item 8, further comprising:
providing the content segment to an NLP model as an input; and
receiving the program as an output from the NLP model.

Item 10. The method of item 9, wherein the NLP model is trained by using at least one of supervised learning and reinforcement learning.

Item 11. The method of item 9, wherein the NLP model includes a pretrained transformer for encoding the content segment and a transformer decoder for decoding the program.

Item 12. The method of item 9, wherein the NLP model utilizes syntax masking to exclude one or more tokens that are inappropriate for the program given one or more previously decoded program tokens.

Item 13. The method of any of items 8-12, further comprising:
providing the program and the contextual data to a domain-specific language interpreter for evaluating the program; and
receiving the intended time interval as an output from the domain-specific language interpreter.

Item 14. A non-transitory computer readable medium on which are stored instructions that, when executed, cause a programmable device to:
receive a request for natural language processing (NLP) of a content segment, the content segment including one or more temporal expressions;
access contextual data associated with each of the one or more temporal expressions;
decode the content segment into a program that describes a temporal logic of the content segment based on the one or more temporal expressions;
evaluate the program using the contextual data to predict an intended time interval for the content segment; and
provide the intended time interval as an output.

Item 15. The non-transitory computer readable medium of item 14, wherein the instructions further cause the programmable device to:
provide the content segment to an NLP model as an input; and
receive the program as an output from the NLP model.

Item 16. The non-transitory computer readable medium of item 15, wherein the NLP model is trained by using at least one of supervised learning and reinforcement learning.

Item 17. The non-transitory computer readable medium of item 15, wherein the NLP model includes a pretrained transformer for encoding the content segment and a transformer decoder for decoding the program.

Item 18. The non-transitory computer readable medium of item 15, wherein the NLP model utilizes syntax masking to exclude one or more tokens that are inappropriate for the program given one or more previously decoded program tokens.

Item 19. The non-transitory computer readable medium of any of items 14-18, wherein the program is in a domain-specific language.

Item 20. The non-transitory computer readable medium of any of items 14-19, wherein the instructions include a domain-specific language interpreter and the instructions further cause the programmable device to:
provide the program and the contextual data to the domain-specific language interpreter for evaluating the program; and
receive the intended time interval as an output from the domain-specific language interpreter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a memory in communication with the processor, the memory comprising executable instructions that, when executed by, the processor, cause the data processing system to perform functions of:
  receiving a request for natural language processing (NLP) of a content segment, the content segment including one or more temporal expressions;
  accessing contextual data associated with each of the one or more temporal expressions;
  parsing the content segment to identify one or more tokens in the content segment
  generating predicted program tokens for an instance of a program in a domain-specific language;
  generating the program in the domain-specific language, using an NLP model and based on the one or more tokens of the content segment and the predicted program tokens, the program describing a temporal logic of the content segment based on the one or more temporal expressions;
  providing the program and contextual data as inputs to an interpreter;
  executing the program using the interpreter to predict an intended time interval for the content segment; and
  providing the intended time interval as an output,
  wherein the NLP model is trained by using at least one of supervised learning and reinforcement learning.

2. The data processing system of claim 1, the memory further storing executable instructions that, when executed by, the processor, cause the data processing system to:
provide the content segment to the NLP model as an input; and
receive the program as an output from the NLP model.

3. The data processing system of claim 1, wherein the NLP model includes a pretrained transformer for encoding the content segment and a transformer decoder for decoding the program.

4. The data processing system of claim 1, wherein the NLP model utilizes syntax masking to exclude one or more tokens that are inappropriate for the program given one or more previously decoded program tokens.

5. The data processing system of claim 1, wherein the executable instructions include the interpreter and the interpreter is a domain-specific interpreter and the memory further stores executable instructions that, when executed by, the processor, cause the data processing system to receive the intended time interval as an output from the domain-specific language interpreter.

6. A method for predicting an intended time interval for a content segment, comprising:
receiving a request for natural language processing (NLP) of the content segment, the content segment including one or more temporal expressions;
accessing contextual data associated with each of the one or more temporal expressions;
parsing the content segment to identify one or more tokens in the content segment;
generating predicted program tokens for an instance of a program in a domain-specific language;
generating the program in the domain-specific language, using an NLP model and based on the one or more tokens of the content segment and the predicted program tokens, the program describing a temporal logic of the content segment based on the one or more temporal expressions;
providing the program and contextual data as inputs to an interpreter;
executing the program using the interpreter to predict an intended time interval for the content segment; and
providing the intended time interval as an output,
wherein the NLP model is trained by using at least one of supervised learning and reinforcement learning.

7. The method of claim 6, further comprising:
providing the content segment to the NLP model as an input; and
receive the program as an output from the NLP model.

8. The method of claim 6, wherein the NLP model includes a pretrained transformer for encoding the content segment and a transformer decoder for decoding the program.

9. The method of claim 6, wherein the NLP model utilizes syntax masking to exclude one or more tokens that are inappropriate for the program given one or more previously decoded program tokens.

10. The method of claim 6, further comprising:
receiving the intended time interval as an output from the interpreter.

11. A non-transitory computer readable medium on which are stored instructions that, when executed, cause a programmable device to:
receive a request for natural language processing (NLP) of a content segment, the content segment including one or more temporal expressions;
access contextual data associated with each of the one or more temporal expressions;
parse the content segment to identify one or more tokens in the content segment;
generate predicted program tokens for an instance of a program in a domain-specific language;
generate the program in the domain-specific language, using an NLP model and based on the one or more tokens of the content segment and the predicted program tokens, the program describing a temporal logic of the content segment based on the one or more temporal expressions;
provide the program and contextual data as inputs to an interpreter;
execute the program using the interpreter to predict an intended time interval for the content segment; and
provide the intended time interval as an output,
wherein the NLP model is trained by using at least one of supervised learning and reinforcement learning.

12. The non-transitory computer readable medium of claim 11, wherein the instructions further cause the programmable device to:
provide the content segment to the NLP model as an input; and
receive the program as an output from the NLP model.

13. The non-transitory computer readable medium of claim 11, wherein the NLP model includes a pretrained transformer for encoding the content segment and a transformer decoder for decoding the program.

14. The non-transitory computer readable medium of claim 11, wherein the NLP model utilizes syntax masking to exclude one or more tokens that are inappropriate for the program given one or more previously decoded program tokens.

15. The non-transitory computer readable medium of claim 11, wherein the instructions include the interpreter and the interpreter is a domain-specific language interpreter and the instructions further cause the programmable device to:
  receive the intended time interval as an output from the domain-specific language interpreter.

* * * * *